(12) United States Patent
Winroth

(10) Patent No.: US 8,215,940 B2
(45) Date of Patent: Jul. 10, 2012

(54) LAYER MULTIPLYING APPARATUS

(75) Inventor: Scott Allen Winroth, Ayer, MA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 621 days.

(21) Appl. No.: 12/383,136

(22) Filed: Mar. 20, 2009

(65) Prior Publication Data

US 2010/0239700 A1  Sep. 23, 2010

(51) Int. Cl.
B29C 43/36 (2006.01)
B29C 43/20 (2006.01)
B29C 43/16 (2006.01)

(52) U.S. Cl. ............ 425/132; 425/130; 425/131.1; 425/133.5; 425/462; 425/588; 264/241; 264/245; 264/297.2; 264/328.12; 264/328.8

(58) Field of Classification Search .......... 425/130, 425/131.1, 133.5, 462, 523, 533, 132, 133.1, 425/588; 264/241, 245, 297.2, 328.12, 328.8, 264/513; 366/337, 340

See application file for complete search history.

(56) References Cited

U.S. PATENT DOCUMENTS

| | | | |
|---|---|---|---|
| 3,195,865 A | 7/1965 | Harder | |
| 3,239,197 A | 3/1966 | Tollar | |
| 3,557,265 A | 1/1971 | Chisholm et al. | |
| 3,565,985 A | 2/1971 | Schrenk et al. | |
| 3,620,506 A * | 11/1971 | So ........................ | 366/337 |
| 3,884,606 A * | 5/1975 | Schrenk .................. | 425/133.5 |
| 4,222,671 A * | 9/1980 | Gilmore .................. | 366/337 |
| 4,426,344 A * | 1/1984 | Dinter et al. ............ | 264/173.15 |
| 5,094,788 A | 3/1992 | Schrenk et al. | |
| 5,094,793 A | 3/1992 | Schrenk et al. | |
| 5,202,074 A * | 4/1993 | Schrenk et al. ......... | 264/241 |
| 5,380,479 A * | 1/1995 | Schrenk et al. ......... | 264/241 |
| 5,540,878 A * | 7/1996 | Schrenk et al. ......... | 264/513 |
| 5,628,950 A | 5/1997 | Schrenk et al. | |
| 5,851,067 A * | 12/1998 | Fleischli et al. ........ | 366/337 |
| 6,599,008 B2 * | 7/2003 | Heusser et al. .......... | 366/337 |
| 6,773,156 B2 * | 8/2004 | Henning .................. | 366/337 |
| 6,830,713 B2 * | 12/2004 | Hebrink et al. ......... | 264/1.6 |

(Continued)

OTHER PUBLICATIONS

Center for High Rate Nanomanufacturing Industry Day Poster, Winroth et al., 2007, Fabrication of Coextruded Multilayer Films, Electronic version available from http://www.nano.neu.edu/industry/industry_showcase/industry_day/documents/Winroth.pdf.

*Primary Examiner* — Joseph Del Sole
*Assistant Examiner* — Seyed Masoud Malekzadeh
(74) *Attorney, Agent, or Firm* — Roger C. Phillips

(57) ABSTRACT

Apparatus for multiplying layers in a composite polymer stream includes an intermediate section having open conduits sandwiched between housing sections that close the conduits. The conduits have respective first stages separated by a first blade extending to a first face, and respective second stages separated by a second blade extending to a second face. The first stages separate the stream into sub-streams and compress and shift the sub-streams in a first dimension, whereas the second stages shift the sub-streams in a second dimension. In order to maintain a constant cross-sectional area of the sub-streams, the housing sections may be provided with complementary open channels. The apparatus can be used to multiply layers which are side-by-side or one-over-another by changing orientation in the direction of flow.

14 Claims, 5 Drawing Sheets

U.S. PATENT DOCUMENTS

| | | | |
|---|---|---|---|
| 6,936,203 B2 * | 8/2005 | Reilly et al. | 264/176.1 |
| 7,163,655 B2 * | 1/2007 | Weber et al. | 264/474 |
| 7,322,740 B2 * | 1/2008 | Heusser et al. | 366/337 |
| 7,438,464 B2 * | 10/2008 | Moser et al. | 366/336 |
| 7,458,798 B2 * | 12/2008 | Weber et al. | 425/378.1 |
| 7,531,122 B2 * | 5/2009 | Weber et al. | 264/403 |

* cited by examiner

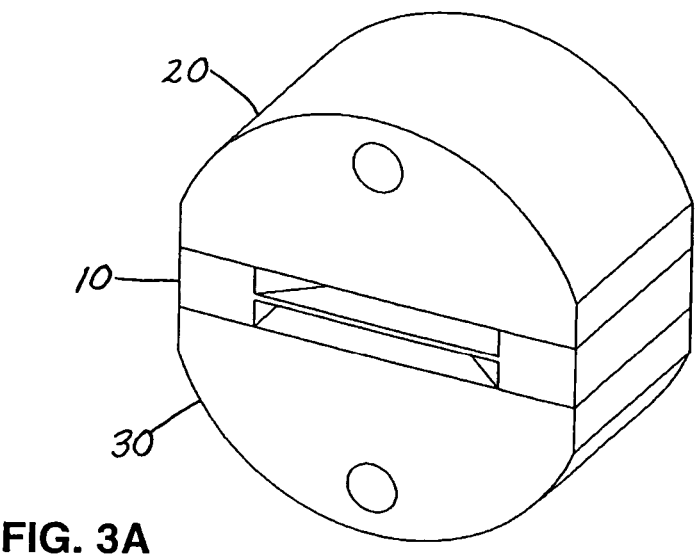
FIG. 3A
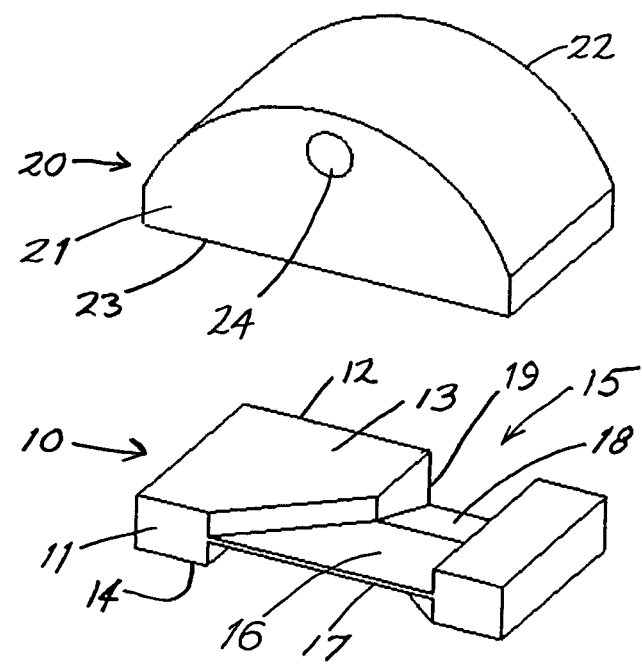
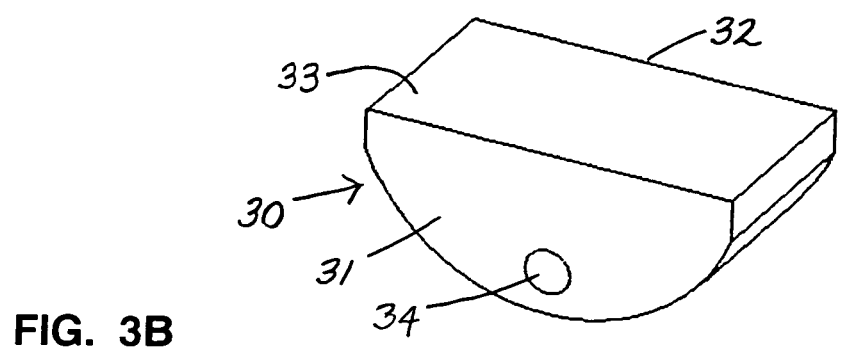
FIG. 3B

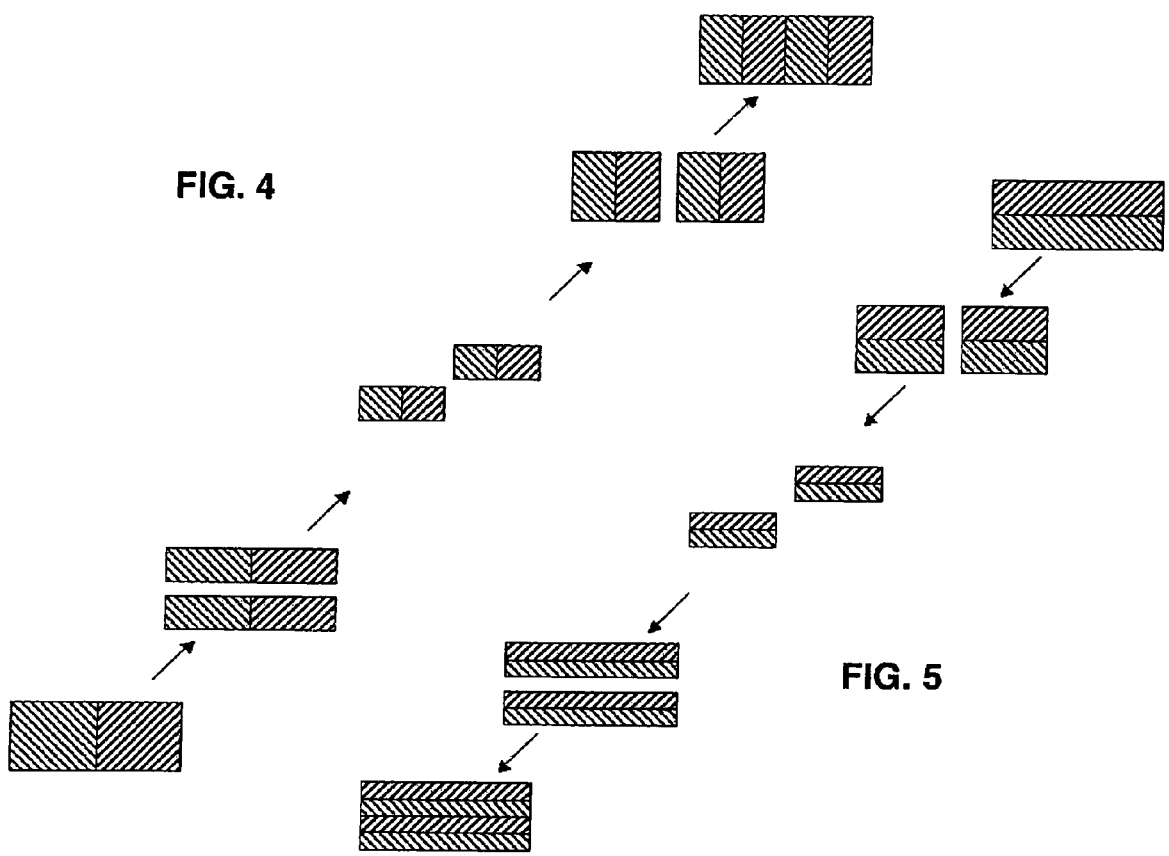

LAYER MULTIPLYING APPARATUS

BACKGROUND OF THE INVENTION

1. Field of the Invention

The present invention relates to an interfacial surface generator or ISG, and more particularly to an apparatus for dividing a composite polymer stream into sub-streams, followed by reshaping, repositioning, and recombining the sub-streams to produce a multi-layer laminate.

2. Description of the Related Art

U.S. Pat. No. 5,094,793 discloses an ISG utilizing a series of plates that are stacked in the Z-direction of an XYZ coordinate system, each plate having closed conduits machined therethrough in the Z direction. The first plate divides a composite polymer stream into a plurality of sub-streams arranged side-by-side in the X direction and repositions the sub-streams one over another in the Y direction; the second plate expands the sub-streams in the X direction; and the third plate compresses the sub-streams in the Y direction and combines them back into a stream having the same cross-section as the original stream. The plates do not offer any possibility of being useful for re-configuring a composite stream received from an opposite direction. Further, the change in cross-sectional areas of the conduits in the second and third plates introduces shear stresses in sub-streams that can be a disadvantage under some rheological conditions. In order to create the square and rectangular profiles of the conduits through the plates, manufacturing requires electron beam machining, which can be time consuming and expensive.

U.S. Pat. No. 5,628,950 discloses another ISG utilizing a stacked plate arrangement, wherein each plate consists of a flat blade sandwiched between a pair of housing sections, each housing section having an open conduit that is closed by the blade. The first plate divides a composite polymer stream into side-by-side sub-streams, and shifts the sub-streams in the Y direction. The second plate repositions the sub-streams in the X direction so that they are one over another. The third plate widens and flattens the sub-streams so that they can be recombined. Because the cross-sectional areas of the sub-streams remain constant as they pass through the plates, the shear stresses in the sub-streams is kept to a minimum. Further, the open conduits in the housing sections can be achieved with traditional machining methods. A major disadvantage is that so many pieces are required, including three different blades and six housing sections with three different conduit profiles.

U.S. Pat. No. 3,239,197 discloses an ISG utilizing a series of baffles nested in a pair of opposing channels formed in respective housing sections. Each baffle is provided with dividing members and deflecting surfaces that cooperate with the channel walls to form closed conduits that first divide a composite polymer stream in the Y direction into two sub-streams, then compress and shift the sub-streams in the X direction, then expand the sub-streams in the Y direction. The next baffle in the channels performs the same operations. Since the cross-sectional areas of the sub-streams are constantly changing, constantly changing flow rates introduce shear stresses that tend to destroy laminarity of the layers and mix the sub-streams. Indeed, the apparatus is designed as a mixer. There is no suggestion that the ISG could be utilized for flow in the opposite direction.

SUMMARY OF THE INVENTION

The ISG according to the invention utilizes a single plate consisting essentially of three parts which divide a composite polymer stream into sub-streams then shape, reposition, and recombine the sub-streams to produce a multi-layer laminate.

According to the invention, an ISG generates interfacial surfaces within a composite stream moving in the Z direction of an XYZ coordinate system, wherein the stream has a pair of adjacent layers and a rectangular cross-section with a width in the X direction and a thickness in the Y direction. The three parts include an intermediate section sandwiched between two housing sections in the Y direction. The intermediate section has oppositely facing first and second faces lying in respective XY planes, and oppositely facing top and bottom faces extending in respective XZ planes between the first and second faces. Each of the top and bottom faces has an open conduit extending between the first and second faces, each conduit having a first stage adjacent to the first face and a second stage adjacent to the second face. The first stages are separated in the Y direction by a first blade extending in an XZ plane, and the second stages are separated at the X direction by a second blade extending in a YZ plane. The first stages contract in the X direction from the first face toward respective second stages, and the second stages expand in the Y direction from respective first stages to the second face. A pair of housing sections received against respective top and bottom faces close the conduits.

The ISG according to the invention can be used to operate on a composite stream received in either of two directions relative to the plate, typically by re-orienting the plate relative to the flow, rather than by changing the direction of flow. Where a first composite stream received in the conduits at the first face comprises two layers side-by-side in the X direction, the stream will be divided in the Y direction into two sub-streams by the first blade, the sub-streams being compressed and shifted in the X direction in the first stages, then expanded in the Y direction in the second stages so they can be re-combined into a stream having four layers side-by-side. Where a second composite stream received in the conduits at the second face comprises two layers one-over-another in the Y direction, the stream will be divided in the X direction into two sub-streams by the second blade, the sub-streams being compressed and shifted in the Y direction in the second stages, then expanded in the X direction in the first stages so they can be re-combined to produce four layers one-over-another in the Y direction.

In a simple embodiment, only the intermediate section has open conduits, the housing sections having flat surfaces received against intermediate section. In this embodiment, the cross-sectional areas and change as the sub-streams move through the conduits, which changes flow rates increases shear stresses in the flowing mass. Since this can promote mixing under some rheological conditions, another embodiment of ISG according to the invention utilizes housing sections having open conduits which complement the open conduits in the intermediate section to form closed conduits having constant cross-sectional areas. This reduces shear stress in the layers, but is more complex to manufacture. However both housing sections are identical, as are the open conduits in opposite sides of the intermediate section, which simplifies manufacture.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 3A is a perspective of a second embodiment of ISG according to the invention;

FIG. 3B is an exploded perspective of the ISG of FIG. 3;

FIG. 4 is a schematic view illustrating layer multiplication steps of a first polymer stream moving in a first direction through the ISG of FIG. 3A;

FIG. 5 is a schematic view illustrating layer multiplication steps of a second polymer stream moving in a second direction through the ISG of FIG. 4B;

DETAILED DESCRIPTION OF THE PRESENTLY PREFERRED EMBODIMENTS

In the discussion that follows, reference will be made to an XYZ coordinate system, wherein the ISG plate channels a composite stream moving in the Z direction, the stream comprising adjacent layers and having a rectangular cross section with a width in the X direction and a thickness in the Y direction.

Figures 1A, 1B:
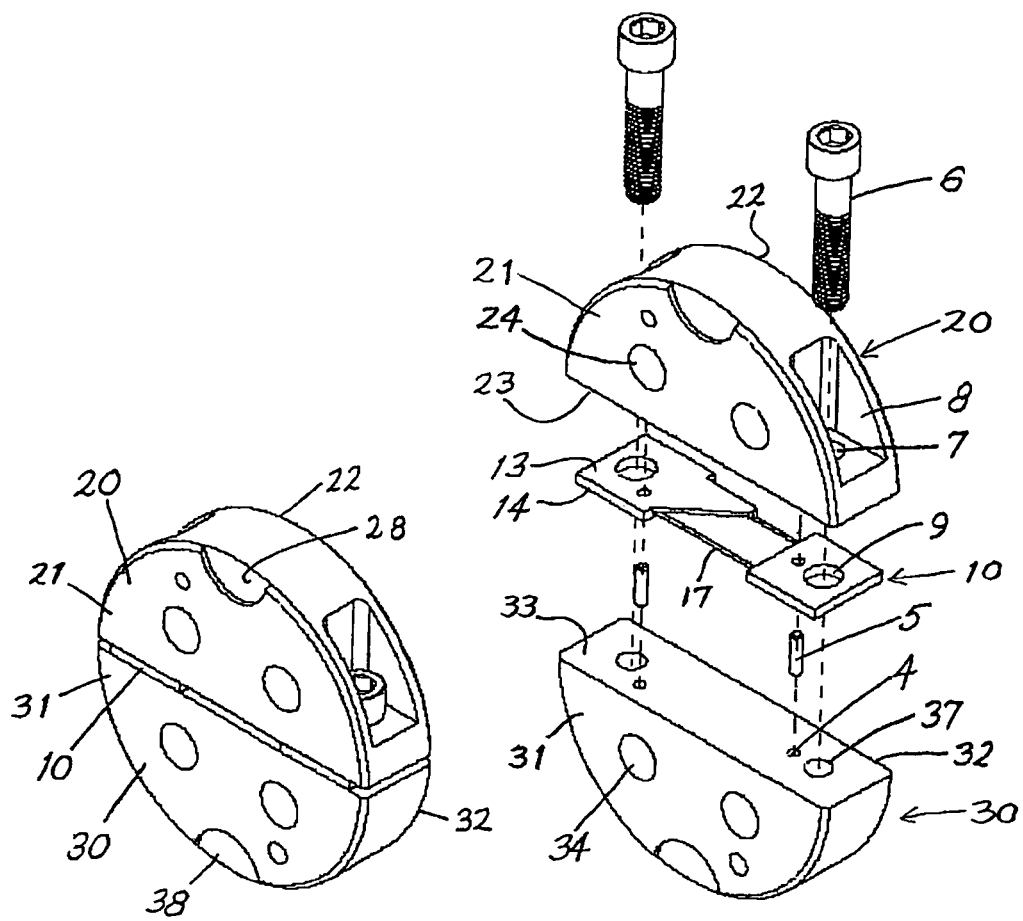
FIG. 1A is a perspective view of a first embodiment of ISG according to the invention.
FIG. 1B is an exploded perspective of the ISG of FIG. 1A.
Figure 2:
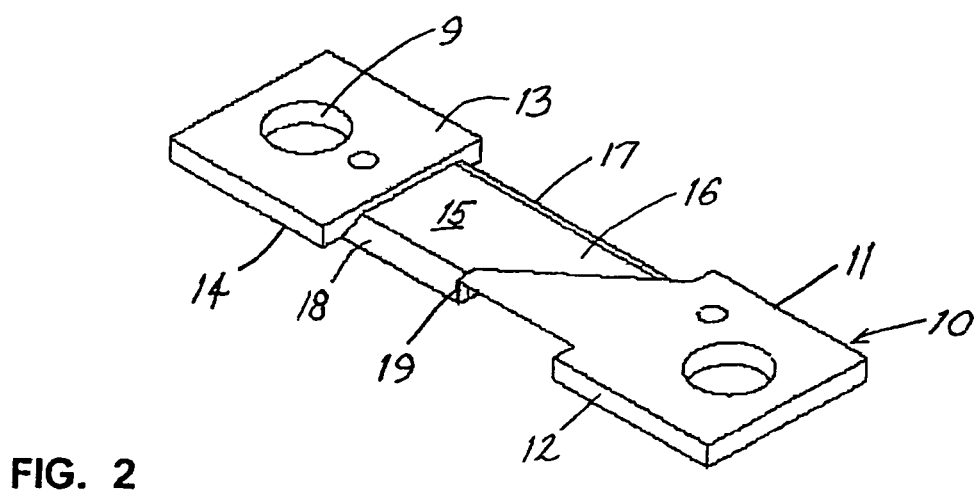
FIG. 2 is an enlarged perspective view of the blade insert of FIGS. 1A and 1B.

Referring to FIGS. 1A and 1B, a first embodiment of ISG plate according to the invention includes an intermediate section 10, a top housing section 20, and a bottom housing section 30, the three basic parts being fixed together by screws 6, which are preferably socket head cap screws. Referring also to FIG. 2, the intermediate section 10 has oppositely facing first and second faces 11, 12, oppositely facing top and bottom faces 13, 14, and an open conduit 15 in each of the top and bottom faces 13, 14. Each open conduit 15 has a first stage 16 and a second stage 18, wherein the first stages 16 are separated by a first blade 17, which extends in an XZ plane, and the second stages 18 are separated by a second blade 19, which extends in a YZ plane. The first stages 16 contract in the X direction from the first face 11 toward respective second stages 18, and the second stages expand in the Y direction from respective first stages 16 to the second face 12.

The top and bottom housing sections 20, 30 have respective bottom and top surfaces 23, 33 which are received against respective top and bottom faces 13, 14 to close the conduits 15. Since the surfaces 23, 33 are flat, the closed conduits have the same profiles as the open conduits 15. The sections 20, 30 have respective first faces 21, 31 and second faces 22, 32 which are coplanar with respective first and second faces 11, 12 of the intermediate section 10. The top housing section 20 has a pair of recesses 8 with holes 7 extending in the Y direction for receiving retaining screws 6. The recesses 8 allow the screws 6 to be contained within the circumference of the assembled plate, which facilitates the attachment of a circular band heater. The screws 6 pass through holes 9 in the intermediate plate 10, and engage in threaded holes 37 in the bottom section 30. Aligning pins 5 are received in respective aligning holes 4 provided in both housing sections, the holes 4 being positioned asymmetrically to assure assembly in only one orientation. Alternatively, it is possible to position the holes symmetrically, so that the sections 20, 30 can be assembled either way.

The top and bottom housing sections 20, 30 also have retaining holes 24, 34 passing between opposing first and second faces 21, 22 and 31, 32; the holes 24, 34 receive bolts or screws which are used to retain the ISG plate to another component such as an adjacent ISG plate or a housing. Alignment pin holes 25, 35 having different sizes or shapes may be provided in the top and bottom housing sections 20, 30 where it is desired to assure that the ISG plate can only be assembled to adjacent components in one orientation.

Since the polymer composite is typically a melt processable thermoplastic that is forced through the ISG plate at pressures of 500 to 5000 psi, temperatures of 100 to 400 C., and viscosities of 10 to 10,000 Pascal-seconds (Pa-s), plastic can find its way into fine seams and cause components to stick together. This is addressed in several ways. The holes 9 have a larger diameter than the screws 6, and are threaded to assist in separating the intermediate section 10 from either of top and bottom sections 20, 30. For example, if the thread size of the screws 6 is UNF ⅜-24, then the threaded holes 9 could be UNF ½-20. A bolt with the latter thread pitch would be used to separate the sections. Each of the housing sections 20, 30 is also provided with notches 28, 38 to assist in separating the assembled ISG from adjacent components subsequent to use.

FIGS. 3A and 3B show a second embodiment, which is functionally similar to the first embodiment but simpler to manufacture and assemble. Here too there is an intermediate section 10 which is sandwiched between upper and lower housing sections 20, 30. The intermediate section 10 has oppositely facing first and second faces 11, 12, oppositely facing top and bottom faces 13, 14, and an open conduit 15 in each of the faces 13, 14. Each open conduit has a first stage 16 and a second stage 18 with geometries essentially as described above. The housing sections 20, 30 are identical and have respective holes 24, 34 which receive bolts or the like for retaining them in a cylindrical housing having a cylindrical bore, as well as for retaining stacked components such as an additional housing plate for re-combining composite sub-streams separated by the blades. In this regard, note that the blades 17, 19 extend all the way to respective faces 11, 12, so that composite sub-streams will not be re-combined by the ISG plate taken alone. This contrasts to the first embodiment, where the blades are recessed from the first and second faces.

FIG. 4 is a schematic view showing the stepwise operations on a composite stream moving in the Z direction from the first faces 11, 21, 31 to the second faces 12, 22, 32 according to either of the first and second embodiments. In a first step, a first composite stream, having two layers side-by-side in the X direction, is divided by the first blade 17 into two sub-streams. As the sub-streams pass through respective first stages 16 of the conduits, they are shifted in opposite X directions as they are compressed in the X direction while the Y dimension remains constant, resulting in smaller cross-sectional areas offset in both the X and Y directions. As the sub-streams pass through respective second stages 18, they are expanded in the Y direction to form four layers side-by-side in the X direction.

FIG. 5 is a schematic view showing the stepwise operations on a composite stream moving in the Z direction from the second faces 12, 22, 32 to the first faces 11, 21, 31 according to either of the first and second embodiments. In a first step, a second composite stream, having two layers one-over-another in the Y direction, is divided by the second blade 19 into two sub-streams. As the sub-streams pass through the second stages 18 of the conduits, they are shifted in opposite Y directions as they are compressed in the Y direction while the X dimension remains constant, resulting in smaller cross-sectional areas offset in both the X and Y directions. As the sub-streams pass through respective first stages 16, they are expanded in the X direction to form four layers one-over-another in the Y direction.

The ISG plate according to the first and second embodiments enables the operations according to either of FIGS. 3 and 4 simply by changing its orientation in the flow direction of a polymer composite. The ISG plate is relatively simple to manufacture, because the conduits are formed exclusively by machining the intermediate section 10; the open conduits 15 are then closed by the flat bottom and top surfaces of the respective top and bottom housing sections. A drawback is that the changing cross-sectional areas can generate excessive shear stresses in the flow under some rheological conditions, e.g. viscosity, pressure, temperature and pressure. These shear stresses can interfere with the laminarity of the layers, which is not desirable when making a multi-layer laminate.

Figure 6:
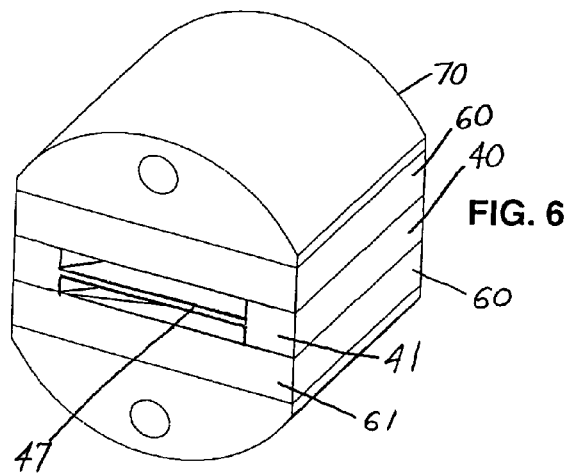
FIG. 6 is a perspective of a third embodiment of ISG according to the invention.

FIG. 6 is a perspective view of a third embodiment of ISG according to the invention, wherein an intermediate section 40 is sandwiched between inner housing sections 60 and outer housing sections 70. The inner sections 60 are separate from the outer sections 70, so that the former can be replaced to obtain different conduit profiles. However each inner housing section 60 could also be designed as one piece with the respective outer housing section 70.

Figure 7A:
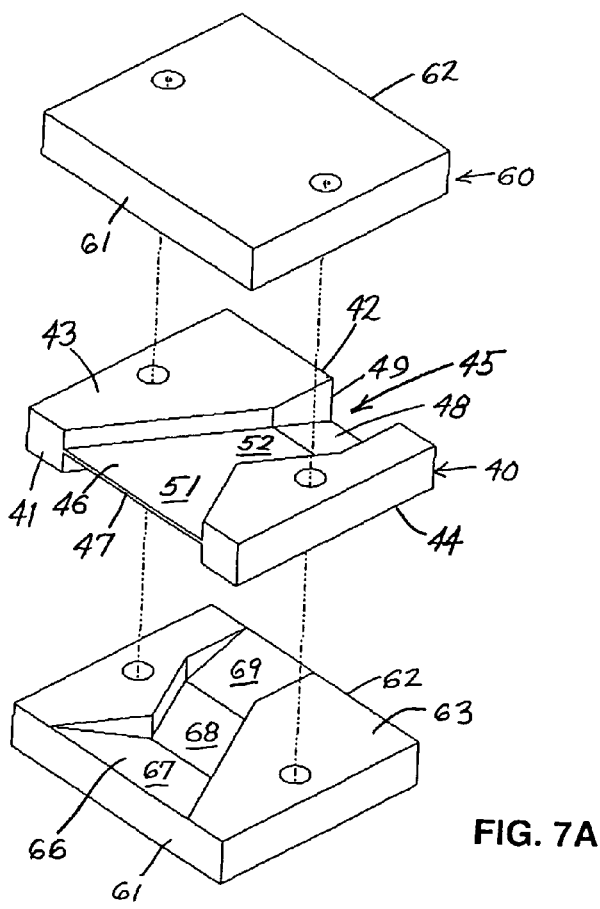
FIG. 7A is an top perspective of the ISG of FIG. 6.
Figure 7B:
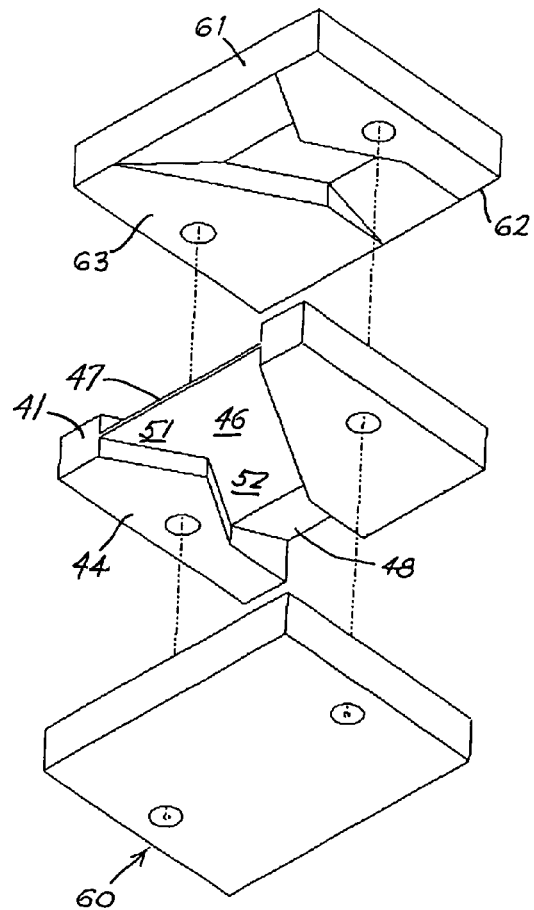
FIG. 7B is an exploded bottom perspective of the ISG of FIG. 7.

FIGS. 7A and 7B show the intermediate section 40 and the inner housing sections 60 in greater detail. Since the housing sections 60 are identical, no distinction will be made between the upper and lower sections in the following description.

The intermediate section 40 has oppositely first and second faces 41, 42, oppositely facing top and bottom faces 43, 44, and an open conduit 45 in each of the top and bottom faces 43, 44. Each open conduit has a first stage 46 and a second stage 48, wherein the first stages 46 are separated by a first blade 47, which extends in an XZ plane, and the second stages 48 are separated by a second blade 49, which extends in a YZ plane. The first stages 46 each have a first section 51 and a second section 52. The first section 51 contracts in the X direction from the first face 41, whereas the second section 52 shifts in the X direction while the X dimension remains constant. The second stages expand in the Y direction from respective first stages 46 to the second face 42.

The housing sections 60 each have first and second faces 61, 62, a profiled face 63 extending between the first and second faces, and an open conduit 65 which complements the open conduit 45 in the intermediate section 40. Each open conduit 65 has a first stage 66 adjacent to the first face 61 and a second stage 69 adjacent to the second face 62. Each first stage 66 has a first section 67, which contracts in the X direction and expands in the Y direction from the first face 61, and a second section 67, which shifts in the X direction while the X dimension remains constant. Each second stage 69 contracts in the Y direction from the respective first stage 66 to the second face 62, wherein the profiled faces 63 are received against respective top and bottom faces 43, 44 of the intermediate section so that the open conduits 65 of the housing sections 60 and the open conduits 45 of the intermediate section 40 form closed conduits.

Figures 8, 9:
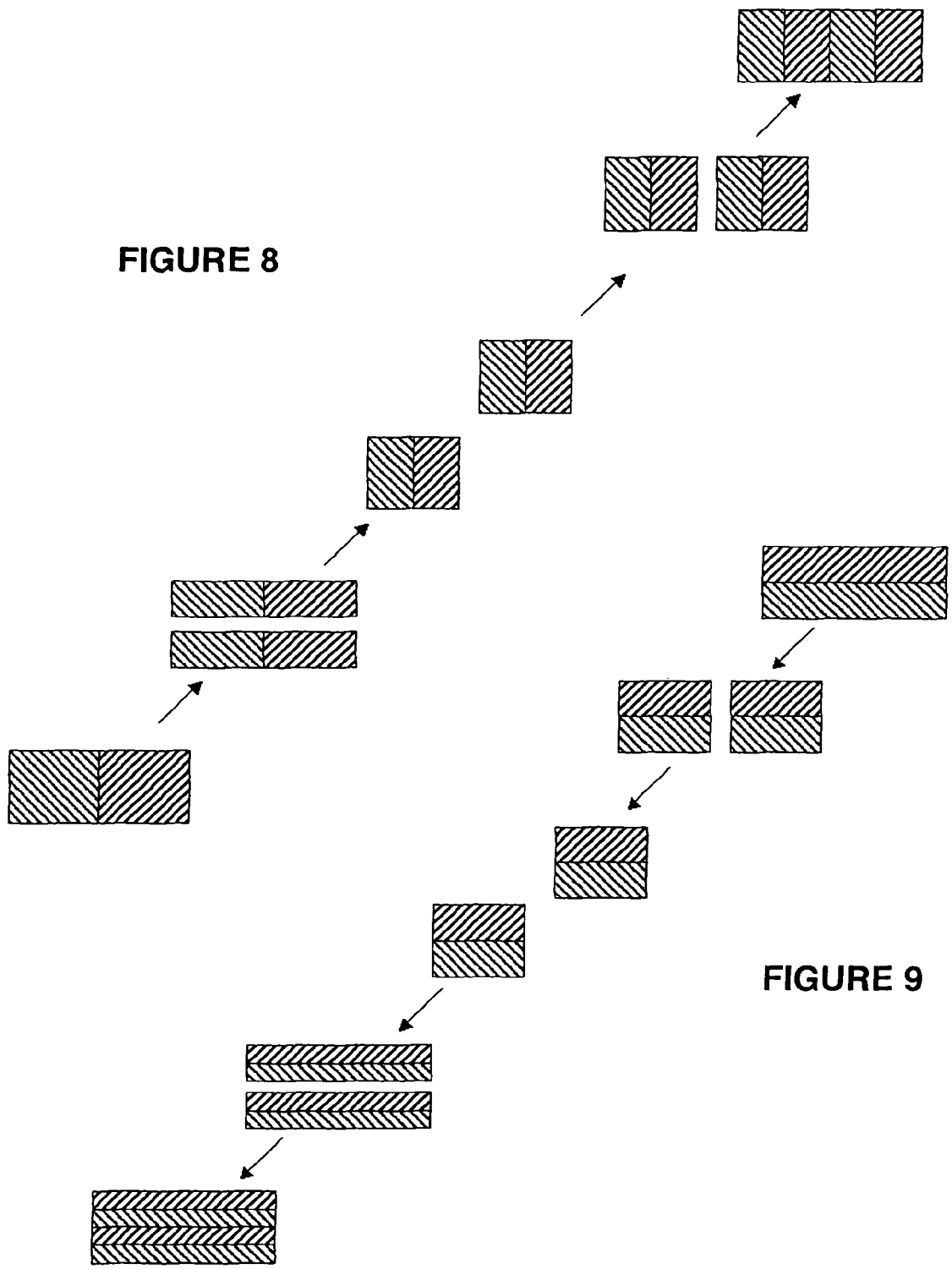
FIG. 8 is a schematic view illustrating layer multiplication steps of a first polymer stream moving in a first direction through the ISG of FIG. 6.
FIG. 9 is a schematic view illustrating layer multiplication steps of a second polymer stream moving in a second direction through the ISG of FIG. 6.

FIG. 8 is a schematic view showing the stepwise operations on a composite stream moving in the Z direction from the first faces 41, 61 to the second faces 42, 62 according to the third embodiment. In a first step, a first composite stream, having two layers side-by-side in the X direction, is divided by the first blade 47 into two sub-streams arranged one-over-another.

As the sub-streams pass through respective first sections 51, 67 of the first stages 46, 66 of the conduits, they are compressed in the X direction while they expand in the Y direction. At this point (not shown) the sub-streams remain aligned one-over-another. As the sub-streams pass through the second sections 52, 68 of the first stages 46, 66, they are shifted in the X direction while the X and Y dimensions do not change. As the sub-streams pass through respective second stages 48, 69, they are shifted in the Y direction while the X and Y dimensions do not change. The sub-streams are now side-by-side in the X direction, and can be combined to form a four-layer stream as shown.

FIG. 9 is a schematic view showing the stepwise operations on a composite stream moving in the Z direction from the second faces 42, 62 to the first faces 41, 61 according to the third embodiment. In a first step, a second composite stream having two layers one-over-another in the Y direction is divided by the second blade 49 into two sub-streams. As the sub-streams pass through the second stages 48 of the conduits 45, 65, the sub-streams are shifted in opposite Y directions while the X and Y dimensions do not change. As the sub-streams pass through the second sections 52, 68 of the first stages 46, 66, they are shifted in the X direction while the X and Y dimensions do not change. At this point (not shown) the sub-streams are aligned one-over-another. As the sub-streams pass through the first sections 51, 67 of the first stages 46, 66, they are expanded in the X direction while they contract in the Y direction. The sub-streams are still one-over another in the Y direction, and can be combined to form a four layer stream as shown.

The ISG plate according to the third embodiment enables the operations according to either of FIGS. 8 and 9 simply by changing its orientation in the flow direction of a polymer composite. The ISG plate is still relatively simple to manufacture, because the conduits in both the intermediate section and the housing sections are open conduits. Further, the top and bottom housing sections 60 are identical. An advantage over the first and second embodiments is that the cross-sectional areas of the sub-streams do not change as they pass through the conduit stages. As a result, the overall velocities of the viscous flow do not change and shear stresses are kept to a minimum, wherefore it is easier to maintain laminarity in the resulting composite stream.

In each of the described embodiments of ISG plate according to the invention, the housing sections carry almost all of the load that is generated by the pressurized polymer flow. Thus, while the housing sections should be made of high strength steel, the intermediate section can be made out of a material such as aluminum which is easier to machine. Only housing sections according to the third embodiment have complex conduits, but even here the conduits are open conduits, which presents the possibility of forging.

The invention is not limited by the embodiments described above which are presented as examples only but can be modified in various ways within the scope of protection defined by the appended patent claims.

I claim:

1. Apparatus for generating interfacial surfaces within a composite polymer stream moving in the Z direction of an XYZ coordinate system, the stream comprising a pair of adjacent layers and having a rectangular cross section with a width in the X direction and a thickness in the Y direction, the apparatus comprising:

a one-piece, sole, intermediate section having oppositely facing first and second faces lying in respective XY planes, and oppositely facing top and bottom faces extending in respective XZ planes between the first and second faces, each of said top and bottom faces having an open conduit extending between the first and second faces, each said conduit having a first stage adjacent to the first face and a second stage adjacent to the second face, the first stages being separated in the Y direction by a sole first blade extending in an XZ plane at one end thereof and, at the other, the first blade being separated into a first sub blade and a second sub blade each of which are angled in opposing directions to the XZ plane, the second stages being separated at the X direction by a second blade extending in a YZ plane, the first stages contracting in the X direction from the first face toward respective said second stages, the second stages expanding in the Y direction from respective said first stages to the second face; and a pair of housing sections received against respective said top and bottom faces to close said conduits, each of said housing sections each having opposed first and second faces in XY planes which are coplanar with respective first and second faces of said intermediate section and wherein the housing sections each have a profiled face extending in an XZ plane between respective said first and second faces, and an open conduit in the profiled face, each said open conduit having a first stage adjacent to the first face and a second stage adjacent to the second face, the first stages of the conduits in the housing sections contracting in the X direction and expanding in the Y direction from respective said first faces toward respective said second stages, the second stages of the conduits in the housing sections contracting in the Y direction from respective said first stages to respective said second faces, wherein the profiled faces are received against respective said top and bottom faces of the intermediate section so that the open conduits of the housing sections and the open conduits of the intermediate section form closed conduits, the first and second stages in the housing sections complementing respective said first and second stages in the intermediate section, whereby, a first composite stream comprising two layers side-by-side in the X direction and received in the conduits at the first face of the intermediate section will be divided in the Y direction by the first blade into two sub-streams, the sub-streams being compressed in the X direction and expanded in the Y direction to produce four layers side-by-side in the X direction, and a second composite stream comprising two layers one-over-another in the Y direction and received in the conduits at the second face of the intermediate section will be divided in the X direction by the second blade into two sub-streams, the sub-streams being compressed in the Y direction and expanded in the X direction to produce four layers one-over-another in the Y direction.

2. The apparatus of claim 1 wherein the first stages contract in the X direction continuously from the first face of the intermediate section to the second stages.

3. The apparatus of claim 1 wherein the first stages each have a first section adjacent to the first face of the intermediate section and a second section adjacent to the second stage, wherein each said first section has a dimension in the X direction which decreases continuously, and each said second section has a dimension in the X direction which remains constant, each said second section shifting in the X direction toward the corresponding second stage.

4. The apparatus of claim 1 wherein the first stages have a constant dimension in the Y direction, and the second stages have a constant dimension in the X direction.

5. The apparatus of claim 1 wherein the first stage of the open conduit in each said housing section has a zero dimension in the Y direction at the respective said first face.

6. The apparatus of claim 1 wherein the second stage of the open conduit in each said housing section has a zero dimension in the Y direction at the respective said second face.

7. The apparatus of claim 1 wherein the closed conduits have cross-sectional areas taken in XY planes, wherein the cross-sectional areas are substantially constant throughout the conduits between the first and second faces.

8. The apparatus of claim 1 wherein the sub-streams of the first composite stream are compressed in the X direction and expanded in the Y direction in the first stages, and repositioned in the second stages, the sub-streams of the second composite stream being repositioned in the second stages, and expanded in the X direction and compressed in the Y direction in the first stages.

9. The apparatus of claim 1 wherein the housing sections are identical.

10. The apparatus of claim 1 wherein the housing sections are fixed together by a pair of bolts received through holes in the intermediate section, the bolts each having a threaded portion and a head, one of the housing sections having threaded bores which receive the threaded portions, the other of said housing sections having recesses which receive the bolt heads.

11. The apparatus of claim 1 further comprising a retaining housing having a recess, the intermediate section and the housing sections being received in the recess.

12. The apparatus of claim 11 wherein the recess has a floor with a pair of upstanding pins, each said housing section having a hole which receives a respective said pin.

13. The apparatus of claim 1 wherein at least one of the first blade and the second blades is recessed from a respective at least one of the first and second faces of the intermediate section.

14. The apparatus of claim 1 wherein at least one of the first and second blades extends to a respective at least one of the first and second faces of the intermediate section, the apparatus further comprising a housing plate received against said at least one of said first and second faces, the housing plate having a rectangular opening for pressing the sub-streams together.

* * * * *